June 22, 1965 G. A. ALPHONSE 3,191,160

CRYOELECTRIC CIRCUITS

Filed March 30, 1962 2 Sheets-Sheet 1

INVENTOR.
GERARD A. ALPHONSE
BY
Samuel Cohen
ATTORNEY

June 22, 1965 G. A. ALPHONSE 3,191,160

CRYOELECTRIC CIRCUITS

Filed March 30, 1962 2 Sheets-Sheet 2

| STEP | NUMBER STORED | | | | |
|---|---|---|---|---|---|
| | a | b | c | d | e |
| 1 | 1 | — | — | — | — |
| 3 | 1 | 1 | — | — | — |
| 5 | 0 | 1 | 1 | — | — |
| 7 | 0 | 0 | 1 | 1 | — |
| 9 | 1 | 0 | 0 | 1 | 1 |
| 11 | 1 | 1 | 0 | 0 | 1 |
| 13 | 1 | 1 | 1 | 0 | 0 |

INVENTOR.
GERARD A. ALPHONSE
BY
Samuel Cohen
ATTORNEY

United States Patent Office 3,191,160
Patented June 22, 1965

3,191,160
CRYOELECTRIC CIRCUITS

Gerard A. Alphonse, New York, N.Y., assignor to Radio Corporation of America, a corporation of Delaware
Filed Mar. 30, 1962, Ser. No. 183,876
5 Claims. (Cl. 340—173.1)

The present invention relates to improved circuits employing superconductor elements.

An element common to the circuits of the invention includes a superconductive member which includes two continuous paths, having a portion in common, for storing persistent circulating currents. If both paths are free, a current induced in the element is stored as persistent currents in both paths, the path of smaller inductance (the preferred path) storing a greater amount of current than the other or second path. If, after a persistent current is flowing in the preferred path the preferred path is "opened," all the persistent current is forced to circulate in the second path. The current induced in the element can also set up a persistent current in the preferred path alone, regardless of the respective inductances of the two paths, if the second path is "opened" during the storing operation. In this case, all the persistent current is stored in the preferred path, and does not flow in the second path until the preferred one is opened.

A number of elements such as described above may be associated with one another to form shift registers, ring counters, memory elements, delay lines and so on. In such circuits the second path of one element is linked with one of the path of the succeeding element in such manner that when the preferred path of the one element is opened, the subsequent current flow in the second path of that element induces a persistent current in one of the paths of the second element. Alternatively, the arrangement may be such that when the preferred path in one element is opened, a signal is applied to a succeeding element for opening a preferred path in the succeeding element.

The circuits above have a number of operating advantages. The response of the individual superconductors elements can be relatively fast so that the shift register, for example, can be made to operate at relatively high speeds. The superconductor element can be made to perform various logic operations. The superconductor element is of relatively small size and can easily be fabricated at relatively low cost.

The invention is described in greater detail below and is illustrated in the following drawings of which:

FIG. 1*a* is a diagram of a superconductive element according to the present invention;

FIG. 1*b* is a equivalent circuit diagram of the element of FIG. 1*a*;

FIGS. 2*a* to 2*d* inclusive are diagrams to explain the operation of the circuit of FIG. 1;

It is to be understood in the explanation which follows that the elements and circuits of the present invention are maintained, during operation, in a low temperature environment, that is, at a temperature of say a few degrees Kelvin at which superconductivity is possible.

Figure 1A:
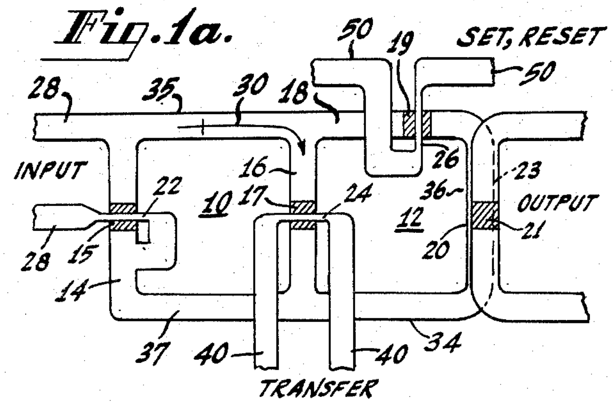
Figure 1B:
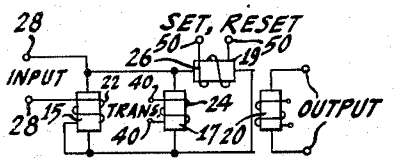

The element shown in FIG. 1*a* is formed of superconductive materials such as lead (shown in clear) and tin, or indium or other similar materials (shown cross-hatched) which can be driven normal at a lower value of magnetic field than lead. Alternatively, the elements may be formed of only one material and the areas shown cross-hatched made of restricted cross-section. The element includes two apertures 10 and 12. Each leg 14, 16, 18 includes the gate electrode 15, 17 and 19, respectively, of a cryotron. The cryotrons, in turn, each may have a superconductor winding 22, 24 and 26, respectively, which is electrically insulated from its respective gate electrode. These windings serve as the control electrodes of the cryotrons. The "output" leg 20 is inductively coupled to the gate electrode 21 of a leg 23 in a second element. There may be a control electrode inductively coupled to the gate electrode 21 and extending at right angles thereto. However, this is not shown in FIG. 1*a*. The entire structure may be of the thin film type (although it is not restricted to the use of thin films), however, it is illustrated in the remaining figures with the equivalent circuit shown in FIG. 1*b*. The same reference numerals are used to designate those elements of FIGS. 1*a* and 1*b* which correspond.

The operation of the element of FIG. 1 is depicted in FIGS. 2*a*–2*d*. It may be assumed that initially no circulating current is present in the superconductor element. Further, no signal is applied to any of the control electrodes of the cryotrons. An input pulse may now be applied to terminals 28 of sufficient amplitude to drive the gate electrode 15 normal. A portion of this input current also flows through the path indicated by arrow 30. When the input pulse is removed, the gate electrode 15 returns to its superconductive state and a circulating current is induced in the path indicated by arrow 32 in FIG. 2*a*. This path includes legs 14 and 16 of FIG. 1. There is also a second path which is possible for current flow. This is the longer path 14, 35, 36, 34, 37. However, the inductance of the longer path is larger than that of the shorter path 14, 35, 16, 37 so that most of the current flows in the smaller path. The proportion can be increased by making the longer path even longer to increase its inductance. However, if maximum operating speed is desired, the inductance of the longer path is made as small as possible and circulating current is prevented from flowing therein by applying a pulse to the cryotron 19, 26 (equivalent to opening switch 52—FIG. 2*a*) during the time the persistent current is being established in the shorter path.

Figure 2A:
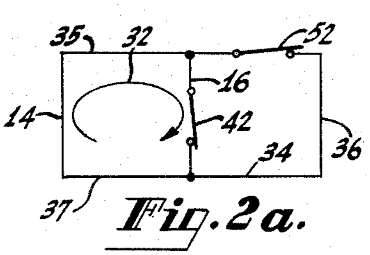
Figure 2B:
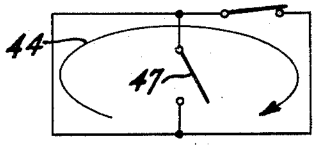

If now a pulse of sufficient ampltiude to drive the cryotron 24, 17 normal is applied to transfer terminals 40, the effect is to open the preferred path 14, 35, 16, 37. The circuit now appears as shown in FIG. 2*b*. The open switch 42 represents the gate electrode 17 in its resistive condition. Now the circulating current is forced to flow through the longer of the two paths, namely the path indicated by arrow 44.

Figure 2C:
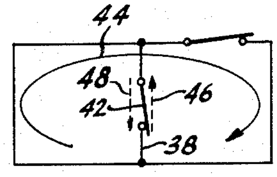

When the pulse applied to the transfer terminal is removed, the situation is as shown in FIG. 2*c*. While one might assume that the current would return to the path of smaller inductance, this does not occur. Instead, the current remains in the longer path as indicated by arrow 44'. In a qualitative way, one can explain this by saying that when the switch 42 closes, there is one component of current which flows through the branch 38 in one direction as indicated by arrow 46 and there is another component of current which flows through the same branch in the opposite direction as indicated by arrow 48. The component 46 is the one derived from the longer path and the component 48 is the one derived from the shorter or preferred path. These two components essentially cancel one another.

Figure 2D:
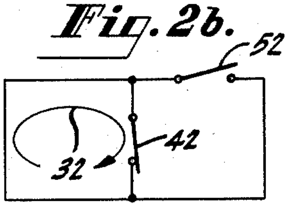

If now a third pulse of sufficient amplitude to drive the gate electrode 19 normal is applied to the set terminals 50, the resulting circuit condition is as represented in FIG. 2*d*. The cryotron 19, 26 is represented by open switch 52. Since this open switch interrupts the longer path, the persistent circulating current returns to the shorter path as indicated by arrow 32. It might be mentioned that if switches 42 and 52 are opened concurrently, the circulating current 32 will be eliminated entirely.

Figure 3:
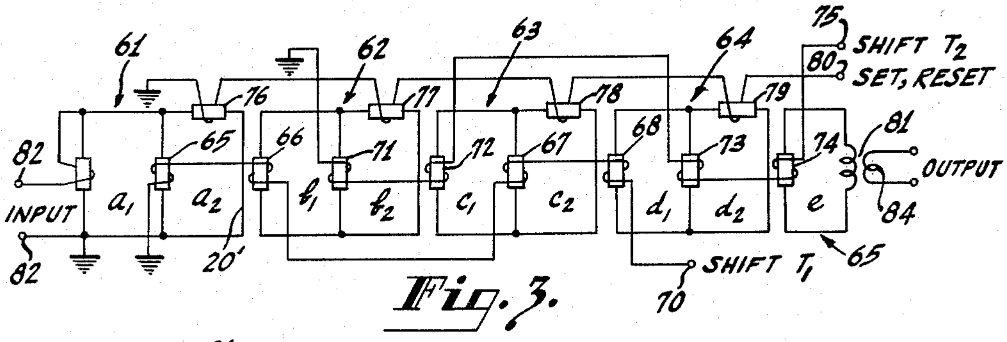
FIG. 3 is a schematic circuit diagram of a shift register according to the present invention.

A circuit in which the element of FIGS. 1 and 2 is employed is shown in FIG. 3. This circuit is a shift register. It can include a large number of superconductor elements according to the invention, however, for purposes of simplifying the explanation, only four such elements 61, 62, 63 and 64 are shown. In addition, there is also an output superconductor element 65. The elements are arranged so that the leg 20' of each element is immediately adjacent to and inductively coupled to the cryotron element appearing in the preferred path of the next adjacent element (as shown also in FIG. 1*a*). The control electrodes of the cryotrons 65, 66, 67 and 68 are connected serially between a shift terminal 70 and ground. The control electrodes of the cryotrons 71, 72, 73 and 74 are connected serially between a second shift terminal 75 and ground. The control electrodes of cryotrons 76, 77, 78 and 79 are connected serially between a set-reset terminal 80 and ground. The transformer 81 serves as an output circuit element.

Figure 4:
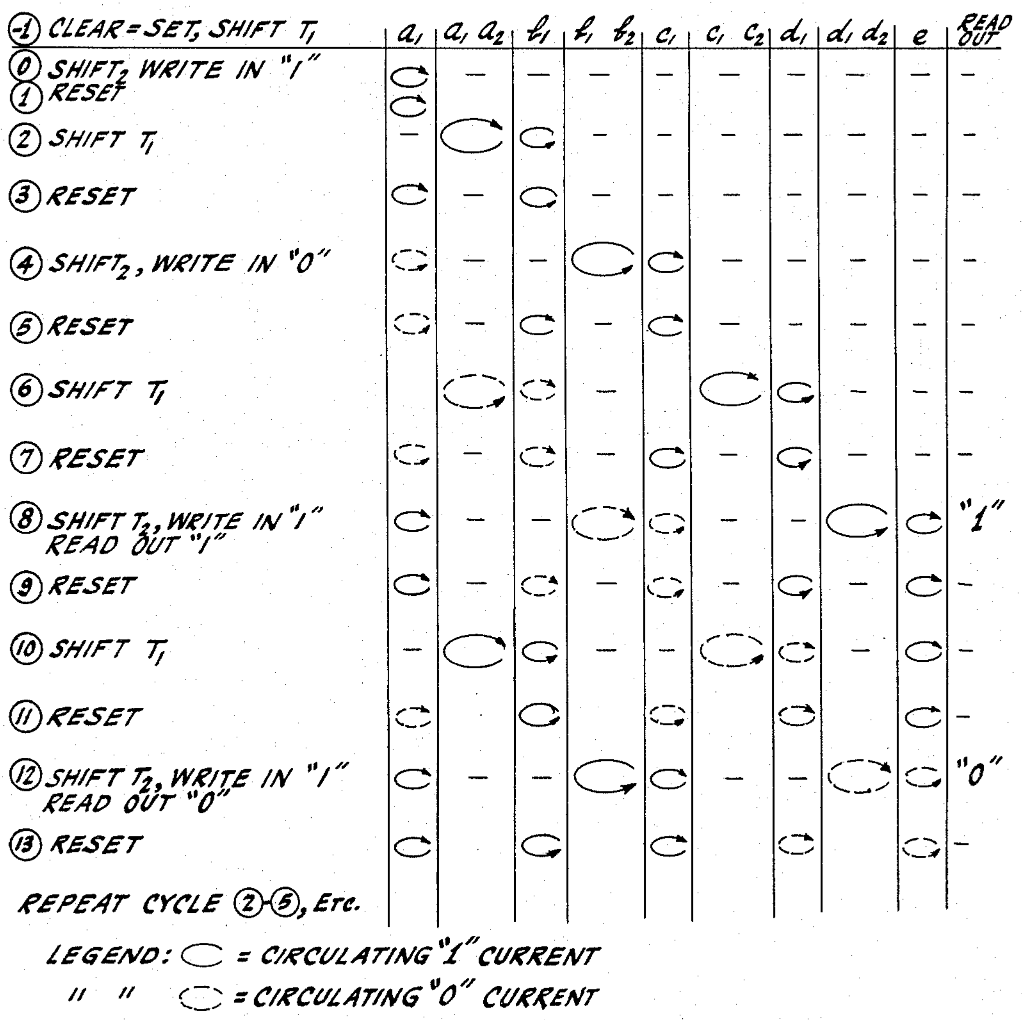
FIG. 4 is a chart to help explain the operation of the shift register of FIG. 3.

The operation of the shift register of FIG. 3 may be understood from FIG. 4. The shift register may be cleared by applying a set pulse and a shift $T_1$ pulse concurrently. The effect of doing this is to open the preferred and second paths in all the superconductor elements 61, 62, 63, 64. If desired, the shift $T_2$ pulse may also be applied to ensure the decay of any circulating current in the output element 64. This is shown in FIG. 4 as part of step 0, which is discussed below.

The next step 0 is to insert the first binary bit in the register. The binary bit "one" corresponds to a pulse of one polarity and the binary bit "zero" corresponds to a pulse of opposite polarity. For the sake of the present discussion, it is arbitrarily assumed that the pulse representing the binary bit "one" induces a circulating clockwise current in the first element and the pulse representing the binary bit "zero" includes a counterclockwise current in the first element.

By way of example, as shown in FIG. 4, to start with, a "1" is written into the shift register; that is, a pulse is applied to terminals 82 which causes a clockwise circulating current to flow in the preferred path $a_1$. The next part of the cycle is the application of a reset pulse to terminal 80. This step can be omitted as there is no information presently in the shift register, however, it is included for the sake of completeness, that is, to show the repetitive nature of the shifting operation. Next, the shift $T_1$ pulse occurs. This causes the circulating current present in loop $a_1$ to flow instead in the longer loop $a_1a_2$. (Loop $a_1$ corresponds to 14, 35, 16, 37 and loop $a_2$ corresponds to 14, 35, 36, 34, 37, both in FIG. 2*a*.) The shift pulse also drives the cryotron 66 to its normal state. When the cryotron 66 is driven normal, the magnetic field generated by the current now flowing in path $a_1a_2$ links the path $b_1$ of the second superconductor element 62. When the shift pulse $T_1$ is removed, a current is produced in loop $b_1$ which tends to maintain the magnetic field which links $b_1$ from collapsing. This current remains as a persistent current which continues to circulate in loop $b_1$. There is also a persistent current which remains in loop $a_1a_2$.

The next step 3 is the application of a reset pulse to terminal 80. This drives the cryotrons 76 and 77 (and 78 and 79) normal. As a result, persistent circulating current remains in loops $a_1$ and $b_1$. The persistent current in loop $a_1$ is clockwise. However, the magnetic field which induced the persistent current in loop $b_1$ is in a direction to cause the current in loop $b_1$ to circulate in the counterclockwise direction. Both the currents in loops $a_1$ and $b_1$ represent storage of a "1." To avoid confusion, a solid line with an arrow represents storage of a "1" and a dashed line with an arrow represents storage of a "0" in FIG. 4.

The next step 4 is the application of a shift pulse $T_2$ to terminal 75 and the concurrent write-in of a new bit. For purposes of this illustration, it is assumed that the new bit is the binary bit "zero." The shift $T_2$ pulse causes cryotrons 71 and 72 to go normal. This causes the current which formerly flowed in the preferred path $b_1$ to flow in path $b_1b_2$. The magnetic field due to the current flowing in path $b_1b_2$ links the path $c_1$ which is now resistive due to the shift $T_2$ pulse. When the shift $T_2$ pulse is removed, a persistent current remains in path $b_1b_2$ and is induced in path $c_1$ (see step 4, FIG. 4). The current in path $b_1b_2$ is counterclockwise and the current in path $c_1$ is clockwise. The "zero" input pulse, in the meantime, has induced a counterclockwise circulating current in path $a_1$.

A number of additional steps in the operation of the shift register of FIG. 3 are shown in FIG. 4. In brief, information may be written into the shift register once each cycle. The cycle consists of four steps, namely reset, shift $T_1$, reset, shift $T_2$. The write-in occurs during each fourth step. As will be seen further down on the chart, the read-out also occurs during the fourth step. In the example shown, information is written in during the steps 0, 4, 8, and 12. The binary bit written in in step 0 is read out in step 8. A binary bit written in in step 4 is read out in step 12 and so on.

The output means for the arrangement of FIG. 3 consists of a transformer 81. A voltage is induced in the secondary winding 84 if a persistent circulating current is present in loop $d_1d_2$ when the cryotron 74 is driven normal. The polarity of the output signal depends upon the direction of the persistent current flow through the primary winding of the transformer 81 and this, in turn, depends, of course, on the direction of the circulating current in the loop $d_1d_2$ at the time cryotron 74 is driven normal. The winding 84 may connect to a sense amplifier and the later may be one of the gated type. The gating pulse in this case may be the shift $T_2$ pulse.

While not shown, it should be appreciated that the register of FIG. 3 may be interconnected as a ring counter. This requires a feedback connection from the last to the first stage. For example, the feedback circuit may include a connection from 84 to the input terminals 82.

Figure 5:
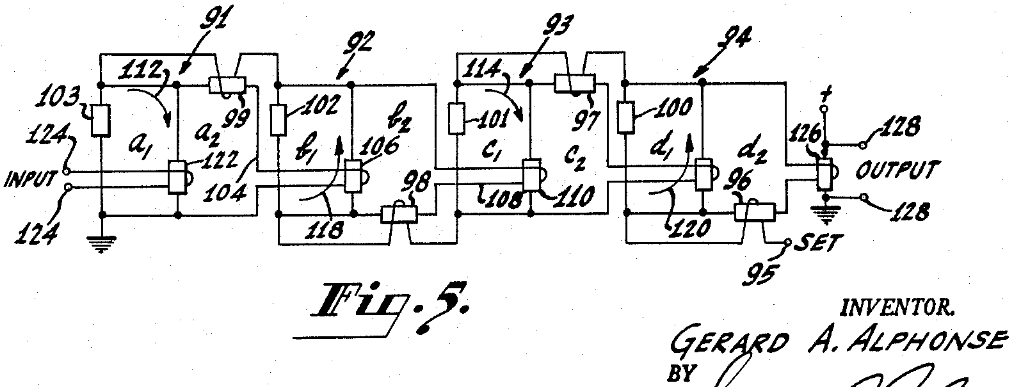
FIG. 5 is a schematic circuit diagram of a delay line according to the present invention.

A delay line according to the present invention is shown in FIG. 5. Again, a large number of superconductor elements according to the present invention may be used, however, only four are shown to illustrate the principle involved. These appear at 91, 92, 93 and 94. The set terminal 95 is coupled to the control electrodes of cryotrons 96, 97, 98 and 99 and the cryotron gate elements 100, 101, 102 and 103. The latter do not require a control electrode in this particular circuit. The output leg of each superconductor element serves as the control electrode of the cryotron in the center leg of the succeeding superconductor element. For example, leg 104 is the control electrode for cryotron 106; leg 108 is the control electrode for cryotron 110, and so on.

In the operation of the circuit of FIG. 5, first a set pulse is applied to terminal 95. This pulse is of sufficient amplitude to drive all of the cryotrons 96–99 and all of the cryotron gate elements 100–103 to which the set terminal 95 is coupled normal. This pulse causes the $a_2b_2c_2$ and $d_2$ loops to open. Further, it causes the cryotron gate elements 100, 101, 102 and 103 to go normal. When the set current pulse is terminated, the clockwise circulating currents indicated by arrows 112 and 114 circulate in paths $a_1$ and $c_1$ and the counterclockwise circulating currents indicated by arrows 118 and 120 circulate in paths $b_1$ and $d_1$. If now an input pulse of sufficient amplitude to drive cryotron 122 normal is applied to input terminals 124, path $a_1$ is opened. The circulating current formerly flowing in this path now flows in loop $a_1a_2$ and through the control winding of cryotron 106. This current drives cryotron 106 normal and causes the clockwise current circulating in path $b_1$ to circulate instead in path $b_1b_2$.

The current flowing in the larger path $b_1b_2$ now drives cryotron 110 normal and so on. After a delay interval equal to four times the delay inserted by a single superconductor element such as 91, the output cryotron 126 is driven normal and an output signal appears at output terminals 128. The delay line may be reset to its original condition by applying a reset pulse to terminal 95.

An important advantage of the delay circuit of FIG. 5 is that a relatively large amount of delay can be obtained with a circuit which occupies a relatively small amount of space and which does not require relatively bulky capacitors, inductors, or the like. In practice, the delay circuit and the shift register circuit are fabricated by printed circuit techniques employing vacuum deposition. The cryotron control electrodes, in practice, may consist of a single winding which is insulated from the gate electrode and which may be at an angle of 90° or so to the gate electrode.

As used in the claims, the expression "persistent current" or "persistent circulating current" refers to a current which is established in a closed superconducting path and which continues to flow after the source which has induced the current has been removed.

What is claimed is:

1. A superconductor circuit element comprising an element formed of a superconductor material and having two apertures therein, a first continuous path for persistent circulating current in the superconductor element around solely one of the apertures and a second continuous path for persistent circulating current in the element surrounding both apertures; means coupled to said element for inducing a persistent circulating current in said first path; means coupled to a portion of said element located between said apertures for causing said persistent circulating current to switch from said first path to said second path; and a second superconductor circuit element substantially identical to the one described above, the first current path of which is coupled to the second current path of the first element.

2. In combination, a plurality of elements, each formed of superconductor material, each having two holes, a first persistent current path around one of the holes, and a second, larger persistent current path around both holes; and a coupling between the second path of each except the last of said elements, responsive to current flow therein, and the portion of the first path between the holes of the following element for making the latter resistive.

3. In combination, a plurality of elements, each formed of superconductor material, each having two holes, a first persistent current path around one of the holes, and a second, larger persistent current path around both holes; a coupling between the second path of each except the last of said elements, responsive to current flow therein, and the portion of the first path between the holes of the following element for making the latter resistive; and means coupled to a portion of the second path in each element not common to the first path of that element for making said portion of the second path resistive.

4. In combination, a plurality of elements, each formed of superconductor material, each having two holes, a first persistent current path around one of the holes, and a second, larger persistent current path around both holes; a coupling between the second path of each except the last of said elements, responsive to current flow therein, and the portion of the first path between the holes of the following element for making the latter resistive; means coupled to a portion of the second path in each element not common to the first path of that element for making said portion of the second path resistive; and means coupled to the first path of each element for establishing a flow of circulating persistent current in each said first path.

5. In combination, a plurality of elements, each formed of superconductor material, each having two holes, a first persistent current path around one of the holes, and a second, larger persistent current path around both holes; a coupling between the second path of each except the last of said elements, responsive to current flow therein, and the portion of the first path between the holes of the following element for making the latter resistive; means coupled to a portion of the second path in each element not common to the first path of that element for making said portion of the second path resistive; means coupled to the first path of each element for establishing a flow of circulating persistent current in each first path; and means coupled to the first of said elements for switching the current in the first path therein to the second path therein.

References Cited by the Examiner

UNITED STATES PATENTS

| | | | |
|---|---|---|---|
| 3,002,111 | 9/61 | Dumin | 307—88.5 |
| 3,021,439 | 2/62 | Anderson | 340—173.1 |

OTHER REFERENCES

Publication #1, IBM Technical Disclosure Bulletin, "Stored Current Bias," Anderson, vol. 3, #7, December 1960, pp. 38–59.

IRVING L. SRAGOW, *Primary Examiner.*